US005109520A

United States Patent [19]

Knierim

[11] Patent Number: 5,109,520

[45] Date of Patent: Apr. 28, 1992

[54] IMAGE FRAME BUFFER ACCESS SPEEDUP BY PROVIDING MULTIPLE BUFFER CONTROLLERS EACH CONTAINING COMMAND FIFO BUFFERS

[75] Inventor: David L. Knierim, Wilsonville, Oreg.

[73] Assignee: Tektronix, Inc., Beaverton, Oreg.

[21] Appl. No.: 129,897

[22] Filed: Nov. 16, 1987

Related U.S. Application Data

[63] Continuation of Ser. No. 702,982, Feb. 19, 1985, abandoned.

[51] Int. Cl.[5] .............................................. G06F 15/62

[52] U.S. Cl. ............................. 395/800; 364/DIG. 2; 364/920.7; 364/926.9; 364/927.2; 395/163

[58] Field of Search ... 364/200 MS File, 900 MS File, 364/518, 519, 520, 521, 522; 358/262; 340/747

[56] References Cited

U.S. PATENT DOCUMENTS

| | | | |
|---|---|---|---|
| 4,303,986 | 12/1981 | Lans | 364/900 |
| 4,310,260 | 2/1982 | Hideshima et al. | 364/900 |
| 4,310,840 | 1/1982 | Williams et al. | 364/900 |
| 4,323,896 | 4/1982 | Fiedler et al. | 340/750 |
| 4,363,104 | 12/1982 | Nussmeier | 364/200 |
| 4,394,753 | 7/1983 | Penzel | 365/236 |
| 4,509,043 | 4/1985 | Mossaides | 340/721 |
| 4,642,794 | 2/1987 | Lavelle et al. | 364/900 |

*Primary Examiner*—Thomas C. Lee
*Assistant Examiner*—Richard Lee Ellis
*Attorney, Agent, or Firm*—Daniel J. Bedell; John P. Dellett; Francis I. Gray

[57] ABSTRACT

A frame buffer memory controller allows rapid image updating while maintaining screen refresh data flow rate. One frame buffer memory controller controls one or more pixel depth columns comprising one or more frame buffer memory chips per pixel. Each frame buffer memory controller listens on a display processor bus for read, write or read-modify-write commands addressed to a pixel, or memory chip, under its control. Such commands, along with the associated addresses and data, are stored in a first-in, first-out (FIFO) buffer for execution during the first free memory cycle.

8 Claims, 4 Drawing Sheets

CONVENTIONAL
FIG. 2A
ARRAY
ARRAY
COMBINATION

IMAGE FRAME BUFFER ACCESS SPEEDUP BY PROVIDING MULTIPLE BUFFER CONTROLLERS EACH CONTAINING COMMAND FIFO BUFFERS

This is a continuation of application Ser. No. 702,982, filed Feb. 19, 1985, and now abandoned.

BACKGROUND OF THE INVENTION

1. Field of the Invention

The present invention relates to frame buffer memory systems for raster displays, and more particularly to a frame buffer memory controller for allowing rapid picture updating while maintaining screen refresh data flow rate.

2. Description of the Prior Art

Raster scan, frame buffer displays have become increasingly popular as the price of semiconductor memory has decreased. The image to be displayed is represented in a large memory that saves a digital representation of the intensity and/or color of each picture element, or pixel, on the screen. By properly recording the data in the memory an arbitrary image can be displayed, making the display hardware insensitive to image content. The frame buffer memory is equipped with hardware to generate a video signal to refresh the display and with a memory port to allow a host computer or display processor to change the frame buffer memory in order to change the image being displayed.

Interactive graphics applications require rapid changes to the displayed image, which in turn require rapid changes to the frame buffer memory. Although the speed of the host processor and display processor is clearly important to high performance, so also are the properties of the memory system, such as update bandwidth, i.e., the rate at which the host processor or data processor may access each pixel. For a given memory technology the implicit geometry of frame buffer memory access can affect this rate. Conventional pixel memory systems arrange words of memory so that a single memory cycle provides access to sixteen, twenty, thirty-two, or some other fixed number of pixels in a horizontal scan line on a display. Other systems use arrays of pixels, such as $4\times4$, $4\times5$, $8\times8$, etc. for each frame buffer word.

A conventional frame buffer memory writes pixels along a horizontal line very rapidly, but is slow for most other directions. For a frame buffer memory with a 16 pixel wide by 1 pixel high word, let the average time to do a memory write be T seconds (including the delay caused by interspersed display refresh reads). Then horizontal lines can be written at a rate as high as 16/T pixels per second. Since the beginning and end of the lines will generally not lie on word boundaries, the actual rate will be less than 16/T on average. Now consider a vertical line, or any line steeper than 45 degrees. Every pixel written will lie in a different word. The pixel rate is thus 1/T pixels per second. Averaging the pixel drawing rate over all vector angles and ignoring the end effects gives roughly 1.36/T pixels per second. Frame buffer memories with words covering a rectangular array of pixels improve on the average pixel writing rate. For a frame buffer memory with a 4 pixel wide by 4 pixel high word and average writing time T, except for the beginning and end of lines, 4 pixels can be written on each memory cycle independent of the orientation of the line. The pixel writing rate thus approaches 4/T pixels per second.

What is desired is a means for speeding up the process of updating the image in frame buffer memory, i.e., increasing update bandwidth.

SUMMARY OF THE INVENTION

Accordingly, the present invention provides a frame buffer memory controller which allows rapid image updating while maintaining screen refresh data flow rate. One frame buffer memory controller controls one or more pixel depth columns comprising one or more frame buffer memory chips per pixel. Each frame buffer memory controller listens on a display processor bus for read, write or read-modify-write commands addressed to a pixel, or memory chip, under its control. Such commands, along with the associated addresses and data, are stored in a first-in, first-out (FIFO) buffer for execution during the first free memory cycle. The result is, for example, a line drawing throughput approaching n times higher where n is the number of pixels per memory word.

Objects, advantages and novel features of the present invention will be apparent from the following detailed description when read in conjunction with the appended claims and attached drawing.

BRIEF DESCRIPTION OF THE DRAWING

FIGS. 2A through 2D are examples of various geometries for frame buffer memory access.

DESCRIPTION OF THE PREFERRED EMBODIMENT

Figure 1:
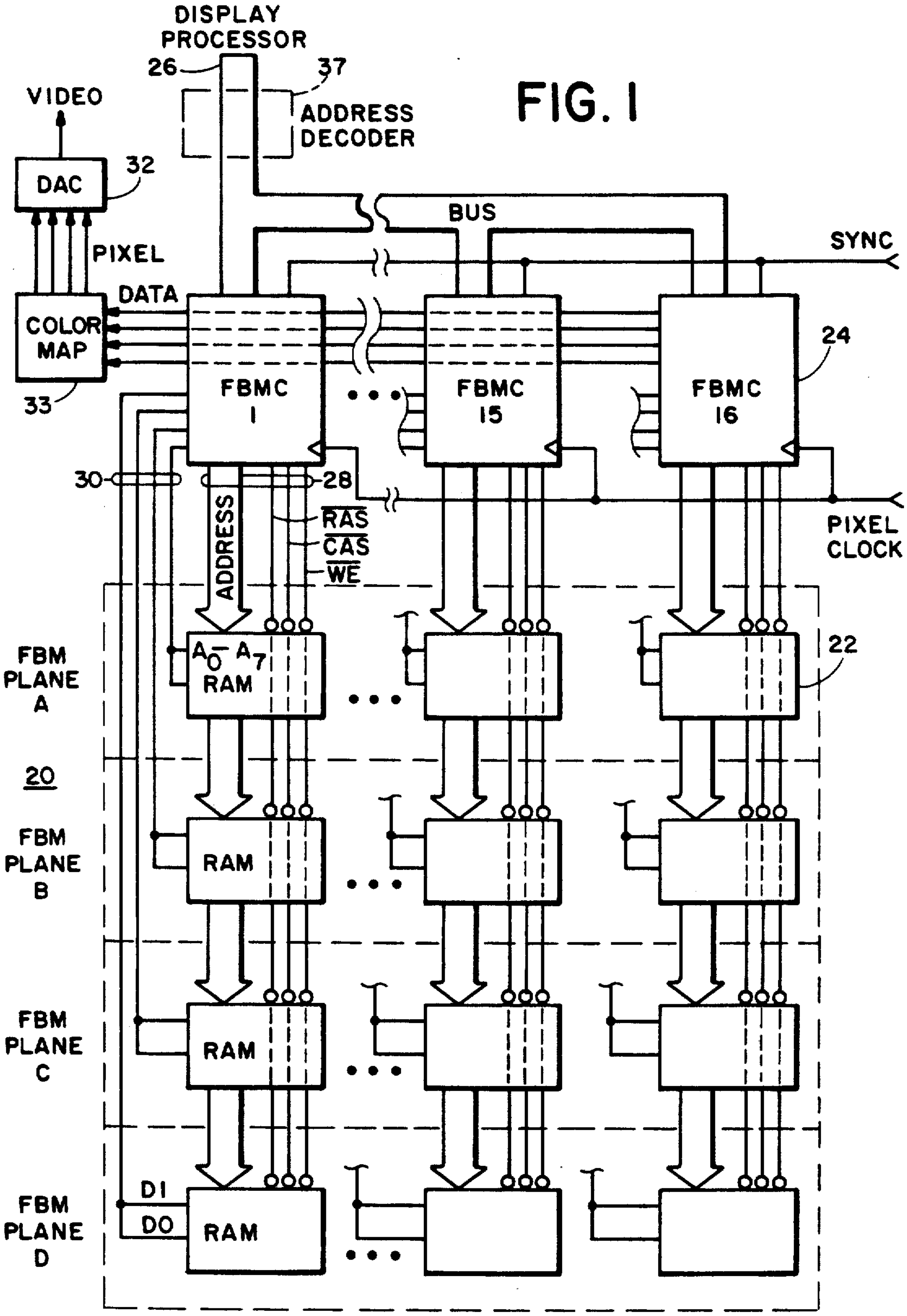
FIG. 1 is a block diagram view of a frame buffer memory according to the present invention.
Figure 2B:
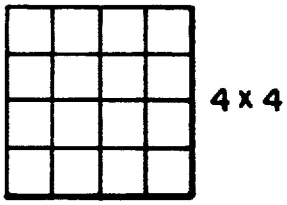

Referring now to FIG. 1 a frame buffer memory 20 is shown generally. The frame buffer memory 20 has a plurality of memory devices 22, typically random access memories (RAM), each RAM corresponding to one plane of one pixel bit in a display or frame buffer, word as shown in FIGS. 2A through 2D. For a conventional memory geometry as shown in FIG. 2A the number of RAMs 22 is $1\times15$ were n is the number of planes (number of bits per pixel). A $1024\times1024$ raster display would require such RAMs to have a 64K capacity.

For each pixel or small group of pixels within the display word a frame buffer memory controller 24 serves as an interface with a display processor bus 26. Each frame buffer memory controller 24 recognizes addresses from the display processor bus 26 which pertain to the RAMs 22 under its control. The associated commands/data are then routed to the appropriate RAM 22 and location within that RAM corresponding to the particular display word via address bus 28 and/or data bus 32 from the frame buffer memory controller 24. Data to be displayed is transferred via the frame buffer memory controller 24 to a digital-to-analog converter 32 for conversion to video data. The example shown for FIG. 1 is illustrative of the configuration for a 16-pixel display word of 4-bits, or planes, per pixel. Inserted between the FBMCs 24 and DAC 32 may be a color map 33 for determining the color of each pixel.

FIG. 1 shows the pixel data for display refresh coming from the FBMCs 24. However, video RAMs 22, such as the TMS 4161 by Texas Instruments Inc., Dallas, Texas, that have integral video shift registers, could be used equally well. In either case the color map 33 or other logic may be inserted in the pixel data path before the DAC 32. As shown the pixel data outputs of the FBMCs 24 are bussed together onto one set of wires (one wire per plane). Under this scheme each FBMC 24 drives the pixel data bus for one pixel clock, then tristates its outputs to allow the next FBMC to send its pixel data. This is practical for low resolution displays with slow pixel clocks. For higher resolution displays the pixel data outputs from each FBMC are not bussed, but are connected to video shift registers as in conventional frame buffer memories with one shift register per plane. Each shift register receives one bit, or as many bits as there are pixels in the display word controlled by the FBMC 24, from each FBMC. Other variations are possible, such as incorporating the shift registers within the FBMCs 24 so that the pixel data output from each FBMC shifts into the next one, with the final output connecting to the color map 33 or DAC 32.

Figure 3:
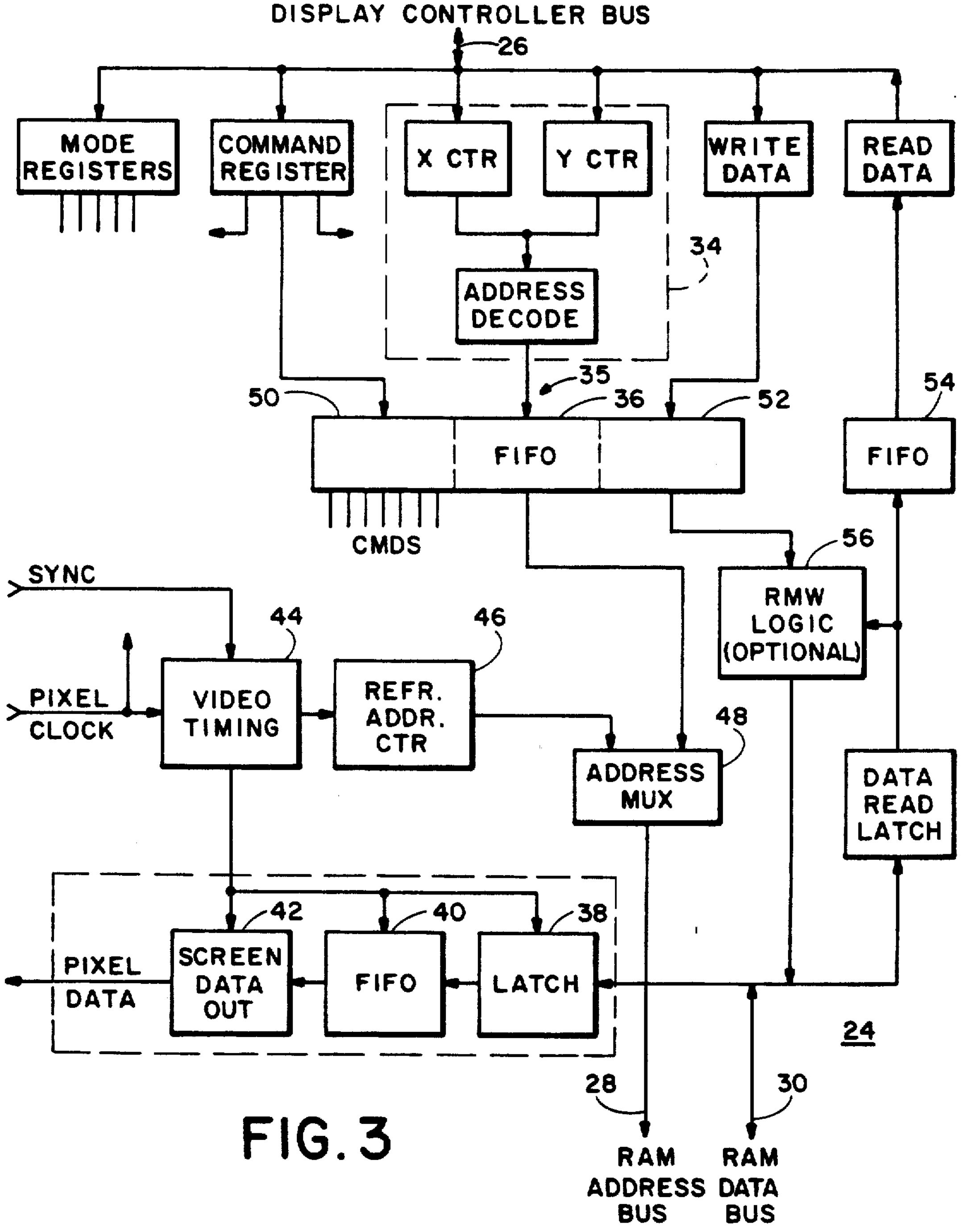
FIG. 3 is a block diagram view of a frame buffer memory controller for the frame buffer memory of FIG. 1.

The frame buffer memory controller 24 is shown in some detail in FIG. 3. An address recognizer circuit 34 is connected to the display controller bus 26 to determine those operations directed to the pixels controlled by that particular frame buffer memory controller. The recognized address is stored in a portion 36 of a FIFO buffer 35 when an associated command is received. During a screen refresh cycle data is read from the RAMs 22, transferred via a latch 38 to a second FIFO buffer 40, and thence to an output buffer 42 to provide the appropriate pixel data. Display refresh timing is provided by a video timing circuit 44 and the pixels are addressed sequentially via a refresh address counter 46. An address multiplexer 48 passes the addresses from the refresh address counter 46 to the RAMs 22 during the refresh cycle, and passes the addresses from the first FIFO buffer 36 to the RAMs 22 for image changes during free memory cycles. The address recognizer circuit 34 may be replaced by an external address decoder 37 on the display processor bus 26 which routes the command/data/addresses to the appropriate FBMCs 24.

When a command/data word on the display bus 26 is recognized as applying to the RAMs 22 associated with the particular frame buffer memory controller 24 by the address recognizer circuit 34, the command/data information is stored in respective portions 50,52 of the FIFO buffer 35 along with the address information. At the first free memory cycle the appropriate RAM 22 is accessed according to the first-in address in the address buffer 36, and the associated command in the command buffer 50 is executed, data in the write buffer 52 being written into the RAM, or data being read from the RAM and either stored in the read buffer 54 for transfer to the display processor via the display bus 26 or for modification and rewrite into the RAM via a read-modify-write (RMW) logic circuit 56.

In operation the frame buffer memory 20 can constantly receive commands/data via the display bus 26 from the display processor even while pixel data is being read from the memory units 22 to refresh the display screen.

The command/data information together with RAM address is stored in the FIFO buffer 35 and acted upon at the first free memory cycle. Thus, the image on the display is rapidly updated since the information for each pixel can be transmitted to the frame buffer memory via the frame buffer memory controllers while the display screen is being refreshed. Additionally, performance is enhanced by the fact that all n FMBCs 24 can be writing pixels simultaneously even when the pixels being written are not on a single horizontal line.

Given the same memory technology and display refresh overhead (same average write time of T seconds) and the same word size (16 pixels) a frame buffer memory 20 as shown in FIG. 1 can write pixels at a rate approaching 16/T per second. This speed improvement is obtained by dividing the frame buffer memory 20 into 16 separate pieces, one for each pixel in the frame buffer word. Each piece of the memory 20 has separate address and data lines controlled by a separate frame buffer memory controller 24. Thus memory accesses are no longer limited to fixed frame buffer words. At any moment each of the 16 FBMCs 24 may be writing a pixel to a different frame buffer word.

To achieve this performance improvement, each frame buffer memory controller 24 has a FIFO buffer 35 for commands, address and data coming from the display processor in addition to the separate address and data lines to the RAMS 22 controlled by it. This FIFO buffer 35 serves two purposes. First, it allows continued receiving of commands from the display processor while the frame buffer memory 20 is busy with display refresh reads. This advantage becomes negligible if video RAMs are used. The second and more important purpose is to allow multiple display processor commands to address the same frame buffer memory controller 24 (same one of the 16 pieces of frame buffer memory 20) without waiting for each memory cycle to finish before sending the next command. On average the display processor commands will address each piece of the memory (each frame buffer memory controller 24) at an equal rate. Over short periods of time, however, one or a few FBMCs 24 may receive most of the commands. The FIFO buffer 35 smoothes out this short term unevenness allowing all pieces of memory to keep busy most of the time.

Figure 4:
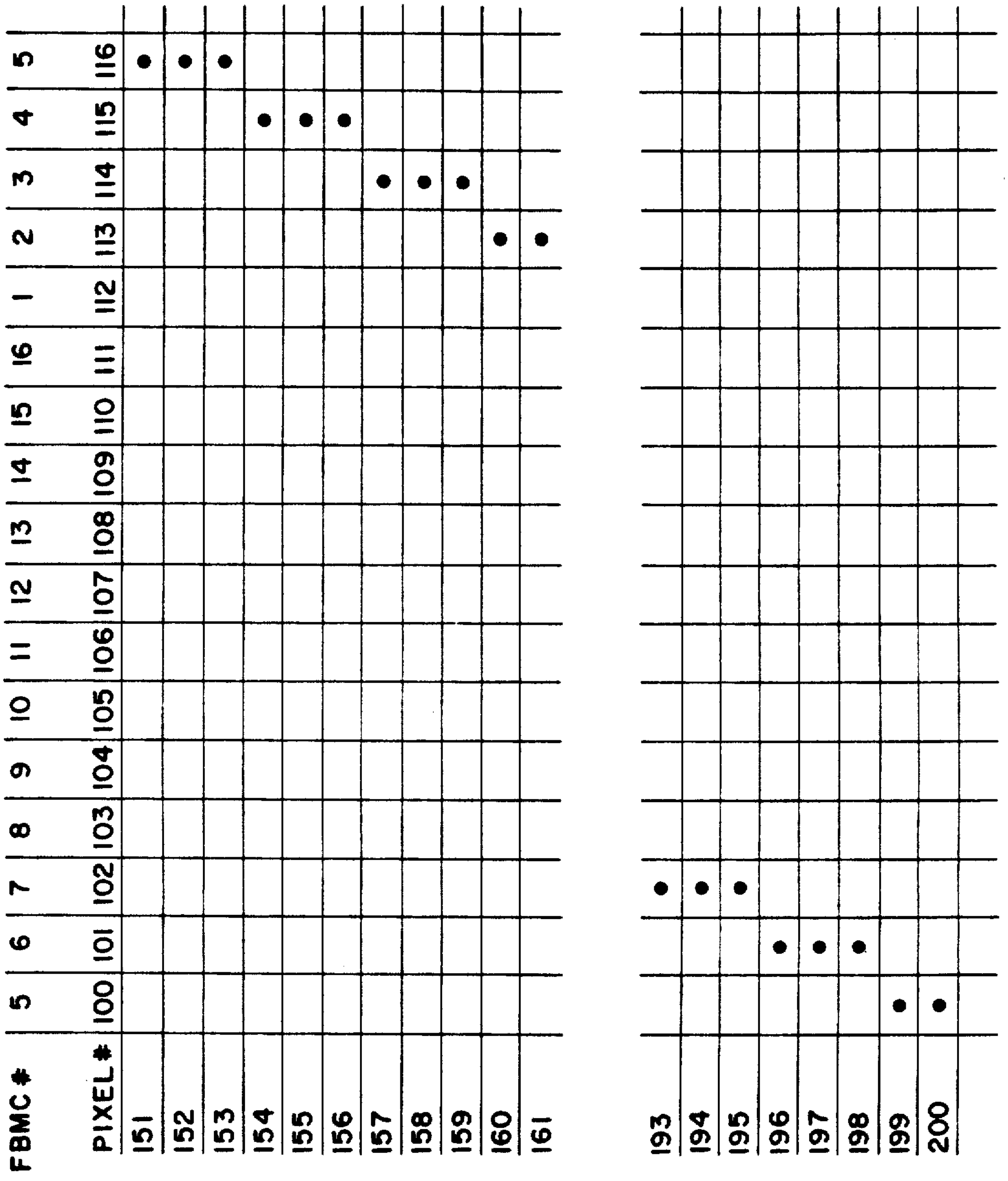
FIG. 4 is an illustration of the operation of the present invention.

Consider an example as shown in FIG. 4 with a 16 pixel wide by 1 pixel high frame buffer word. Further consider the operation of drawing a line into this frame buffer memory with slope of 3 (for every one pixel to the right the line goes 3 pixels up). Let the line run from 100,200 to 150,50. The first two pixel (FBMC) number 5, the next three pixel writes address FBMC number 6, and so on. If the pixel write commands are sent at the rate of 16/T per second, each FBMC just finishes its last write when it is again addressed with three more pixel write commands.

The above example requires the FBMCs 24 to have a FIFO buffer 35 of length 3 or larger to run at the full 16/T rate. For stepper lines (closer to vertical) the required FIFO buffer size is larger. Assume some reasonable FIFO buffer size of 32 words per FBMC 24. Then long lines with slope much over 32 fill the FIFO buffer 35 of one FBMC 24, requiring the display processor to wait until some of the write commands have been executed before continuing. Short vertical lines do not cause this problem unless several lines in succession address the same FBMC 24. Thus a few cases, such as long vertical lines, run slower than 16/T pixels per second. For typical pictures this fraction is very small, and can be made to approach zero by increasing the FIFO buffer size. For random short vectors this example system yields roughly 13/T to 14/T pixels per second with its 32 word FIFO buffer 35.

All performance estimations are proportional to 1/T. If video RAM's are used where display refresh overhead is minimal, then T is simply the memory cycle time. If writes only are being done, then T is the write cycle time. If read-modify-writes are being done, then T is the read-modify-write cycle time. If normal RAMs 22 are used in the frame buffer memory 20 then performance is decreased by the percentage of time used for the display refresh reads. If refresh reads take 50% of the RAMs' time, then T is increased by a factor of two and performance decreases by a factor of two. In either case, however, the relative increase in performance obtained by using FBMCs 24 is the same.

Figure 2C:
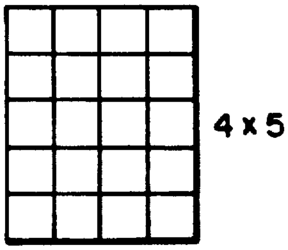
Figure 2D:
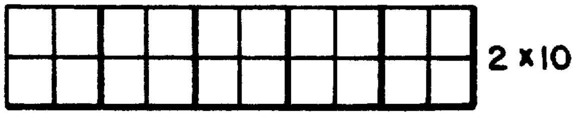

Other display word configurations work equally well, such as a 4 by 4 pixel array or any other size as shown in FIGS. 2*b* and 2*c*. In fact, the 4 by 4 pixel array has a slight advantage in that vertical lines would address 4 different FBMCs 24. It therefore requires four times as long a vertical line to fill the FIFO buffer 35 and cause the display process to wait (for a given FIFO buffer size).

Also the conventional organization may be mixed with the FBMC concept to give a combination implementation. For example, a 20 pixel frame buffer word may be organized as 10 pixels wide by 2 pixels high with 5 FBMCs 24 each controlling a 2 by 2 pixel square within the word. This reduces the number of FBMCs 24 required from 20 to 5. For drawing vectors, each FBMC 24 can write 2 pixels at a time from its 2 by 2 array. Since there are 5 FBMCs 24 writing independently, the writing performance approaches $5*2/T=10/T$ pixels per second. If all 20 FBMCs 24 were used the rate would have approached 20/T. If 10/T pixels per second is sufficient to keep up with the display processor, however, cost can be saved by using only 5 FBMCs 24 instead of 20.

Thus, the present invention provides a frame buffer memory which improves image update bandwidth by using a frame buffer memory controller with a first-in, first-out buffer for each pixel, or small group of pixels, within a frame buffer word.

What is claimed is:

1. A frame buffer memory and control apparatus having a plurality of data storage locations accessed in response to frame buffer words transmitted thereto, each frame buffer work including a command to one of read and write access at least one data storage location of said plurality of data storage locations, comprising:

a plurality of memory means each comprising a separate subgroup of said plurality of data storage locations; and a plurality of memory controllers, each memory controller corresponding to and connected to a separate one of said memory means, each memory controller comprising first-in, first-out buffer means for sequentially receiving, storing and sequentially reading out a plurality of commands included in said frame buffer words, and each memory controller further comprising means for sequentially executing commands read out by said first-in, first-out buffer means by accessing data storage locations of its corresponding memory means.

2. A frame buffer memory and control apparatus as recited in claim 1 wherein each data storage location of said plurality of data storage locations corresponds to at least one pixel of a cathode ray tube display and contains data for controlling a display attribute of the corresponding at least one pixel.

3. A frame buffer memory and control apparatus having a plurality of data storage locations accessed in response to frame buffer words transmitted thereto from an external source of frame buffer words, each frame buffer word including a command for one of read and write accessing at least one data storage location of said plurality of data storage locations, comprising:

a plurality of memory means each comprising a separate subgroup of said plurality of data storage locations; and a plurality of memory controllers, each memory controller corresponding to and connected to a separate one of said plurality of memory means, each memory controller comprising means for receiving from said external source and identifying a plurality of said frame buffer words which include commands for accessing storage locations included in the corresponding memory means, first-in, first-out buffer means for sequentially receiving and then concurrently storing said commands included in each of the identified plurality of frame buffer words, and means for sequentially reading out and executing the concurrently stored commands by accessing at least one data storage location of the corresponding memory means.

4. A frame buffer memory controller responsive to a sequence of input frame buffer words, each frame buffer word of said sequence including a command for one of read or write accessing at least one data storage location of a frame buffer memory comprising a plurality of data storage locations, the frame buffer memory controller comprising:

first-in, first-out buffer means for successively receiving, concurrently storing, and successively reading out commands included in each of a particular subset of said sequence of input frame buffer words, each frame buffer word of said particular subset including a command for one of read and write accessing at least one data storage location of a particular subset of said plurality of data storage locations; and means for sequentially accessing said particular subset of said plurality of data storage locations in response to the successively read out commands.

5. A frame buffer memory controller as recited in claim 4 further comprising means for transferring data stored in said frame buffer memory to a video display.

6. A frame buffer memory and control apparatus responsive to a sequence of frame buffer words transmitted thereto, comprising:

a plurality of addressable memory means, each including a separate group of a plurality of storage locations for storing data, each storage location having a separate identifying address, each frame buffer work of a first portion of said sequence of frame buffer words including an address and a command to read data out of a storage location identified by the address, each frame buffer word of a second portion of said sequence of frame buffer words comprising data, an address, and a command to write said data into one of said storage locations identified by the address; and a plurality of memory controllers, each memory controller corresponding to and connected to a separate one of said memory means, each particular memory controller comprising:

a first-in, first-out buffer for sequentially receiving, storing and sequentially reading out a plurality of frame buffer words;

address recognition means for receiving said sequence of frame buffer words and reading the address included in each frame buffer word of said sequence and for causing said first-in, first-out buffer to receive and store only those frame buffer words of said first and second portions of said sequence that include an address indicating one of the group of storage locations of the memory means corresponding to said particular memory controller; and means receiving each frame buffer word read out of said first-in, first-out buffer, for reading data from and writing data to a storage location identified by the address included in the received frame buffer word in accordance with the command included in the read out frame buffer word.

7. The frame buffer memory and control apparatus in accordance with claim 6 wherein said first-in, first-out buffer stores and outputs data concurrently.

8. A frame buffer memory and control apparatus responsive to a sequence of frame buffer words transmitted thereto, comprising:

a plurality of addressable memory means, each including a separate group of a plurality of storage locations for storing data, each storage location having a separate identifying address, each frame buffer word of a first portion of said sequence of frame buffer words including an address and a command to read data out of one of the storage locations identified by the address, each frame buffer word of a second portion of said sequence of frame buffer works comprising data, an address, and a command to write said data into one of said storage locations identified by the address, each frame buffer word of a third portion of said sequence of frame buffer words including an address and a command to read data out of one of the storage locations identified by the address, to modify the data read out, and to write the modified data back into said one storage location; and a plurality of memory controllers, each memory controller corresponding to and connected to a separate one of said memory means for read and write accessing storage locations thereof, each particular memory controller comprising:

a first-in, first-out buffer for sequentially receiving, concurrently storing and sequentially outputting a plurality of frame buffer words, address recognition means for receiving and reading the address included in each frame buffer word of the first, second and third portions of said sequence and for causing said first-in, first-out buffer to sequentially receive only those frame buffer words of the first, second and third portions of said sequence that include an address indicating one of the group of storage locations of the memory means corresponding to said particular memory controller; and means for receiving each frame buffer word outputted by said first-in, first-out buffer, and for selectively one of reading data from and writing data to a storage location identified by the address included in the received frame buffer word in accordance with the command included in the read out frame buffer word.

* * * * *